United States Patent
Filardo et al.

(10) Patent No.: US 9,257,917 B1
(45) Date of Patent: Feb. 9, 2016

(54) EFFICIENT POWER CONVERSION APPARATUSES, METHODS AND SYSTEMS

(71) Applicants: Benjamin Pietro Filardo, New York, NY (US); William J. Bowhers, Amesbury, MA (US); Baoxiang Shan, Jersey City, NJ (US)

(72) Inventors: Benjamin Pietro Filardo, New York, NY (US); William J. Bowhers, Amesbury, MA (US); Baoxiang Shan, Jersey City, NJ (US)

(73) Assignee: Pliant Energy Systems LLC, Brooklyn, NY (US)

( * ) Notice: Subject to any disclaimer, the term of this patent is extended or adjusted under 35 U.S.C. 154(b) by 172 days.

(21) Appl. No.: 13/736,024

(22) Filed: Jan. 7, 2013

Related U.S. Application Data (60) Provisional application No. 61/583,488, filed on Jan. 5, 2012.

(51) Int. Cl.
 *H01L 41/107* (2006.01)
 *H02N 2/18* (2006.01)

(52) U.S. Cl.
 CPC .................................... *H02N 2/181* (2013.01)

(58) Field of Classification Search
 CPC ....... H02N 1/008; H02N 1/006; H02N 1/004; H02N 1/08; H02N 2/05; H02N 2/14; H02N 2/067; H02N 2/183; H02N 2/196; H02N 2/181; H02N 2/18; H02N 2/186; H03H 3/04; G02B 26/0841; H04R 17/00; G10K 11/002; H01H 2239/076; H01H 2300/03; H03L 1/028; H03B 5/32; B06B 1/0253; B06B 1/0276; B06B 2201/55; H01L 41/042; H01L 41/044; H01L 41/107; H01L 41/1132; F02D 41/2096; F02D 41/221; H02M 7/49; H05B 41/2822

USPC .............. 310/309, 314, 315, 316.01–316.03, 310/317–319, 338, 339, 800
 See application file for complete search history.

(56) References Cited

U.S. PATENT DOCUMENTS

| | | | | |
|---|---|---|---|---|
| 2,575,363 | A | * | 11/1951 | Simons ......................... 331/139 |
| 4,732,129 | A | * | 3/1988 | Takigawa et al. ............. 123/478 |
| 4,784,102 | A | * | 11/1988 | Igashira et al. ............... 123/447 |
| 5,691,592 | A | | 11/1997 | Gunderson et al. |
| 6,016,040 | A | * | 1/2000 | Hoffmann et al. ............ 318/116 |
| 6,198,199 | B1 | * | 3/2001 | Hoffmann et al. ....... 310/316.03 |

(Continued)

FOREIGN PATENT DOCUMENTS

SU     1793277  A1  *  2/1993  ............... G01K 7/32

OTHER PUBLICATIONS

D. Guyomar, et al., "Semi-Passive Vibration Control: Principle and Applications," Annals of the University of Craiova, pp. 57-62, Nov. 30, 2006.

(Continued)

*Primary Examiner* — Thomas Dougherty
(74) *Attorney, Agent, or Firm* — Irell & Manella LLP (57) ABSTRACT

The EFFICIENT POWER CONVERSION APPARATUSES, METHODS AND SYSTEMS include circuits for efficiently converting electrical energy to mechanical energy and vice-versa, such as within a multitude of ElectroActive Polymer (EAP) transducers. Embodiment may support a multitude of EAP transducers while also being capable of directing the movement of energy between electrical and mechanical forms in either direction. In another aspect, an efficient mode of transferring mechanical energy is discussed, via one or more strained and paired elastic transducers coupled to a potential energy reservoir.

20 Claims, 9 Drawing Sheets

(56) References Cited

U.S. PATENT DOCUMENTS

| | | | | |
|---|---|---|---|---|
| 6,661,155 | B2* | 12/2003 | Schrod | 310/316.01 |
| 6,876,135 | B2* | 4/2005 | Pelrine et al. | 310/339 |
| 2006/0097707 | A1* | 5/2006 | Inoshita et al. | 323/222 |
| 2008/0218132 | A1* | 9/2008 | Pelrine et al. | 322/2 A |
| 2014/0282311 | A1* | 9/2014 | Turner et al. | 716/104 |

OTHER PUBLICATIONS

H. Hoffmann, "Power Electronic Circuits for Vibration-Based Energy Harvesting Using Piezoelectric Devices," p. 1-23, 2011.

D. Kwon, et al., "A Single-Inductor AC-DC Piezoelectric Energy Harvester/Battery-Charger IC Converting ±(035 to 1.2 V) to (2.7 to 4.5 V)," 2010 IEEE International Solid-State Circuits Conference, pp. 494-496. Feb. 10, 2010.

G.-B. Chung, et al., "Analysis of an AC/DC Resonant Pulse Power Converter for Energy Harvesting Using a Micro Piezoelectric Device," Journal of Power Electronics, vol. 5, No. 4, pp. 247-256, Oct. 2005.

D. Guyomar, et al., "Recent Progress in Piezoelectric Conversion and Energy Harvesting Using Nonlinear Electronic Interfaces and Issues in Small Scale Implementation," Micromachines, vol. 2, pp. 274-294, Jun. 3, 2011.

D. Morris, "Wind Generated Electricity Using Flexible Piezoelectric Materials," Master's Thesis, University of Minnesota, pp. 1-70, Dec. 2010.

Y. C. Shu, et al., "An Improved Analysis of the SSHI Interface in Piezoelectric Energy Harvesting," Smart Materials and Structures, vol. 16, pp. 2253-2264, Oct. 9, 2007.

I. C. Lien, et al., "Revisit of Series-SSHI With Comparisons to Other Interfacing Circuits in Piezoelectric Energy Harvesting," Smart Materials and Structures, vol. 19, pp. 1-12, Oct. 22, 2010.

G. Wang, "Piezoelectric Energy Harvesting Utilizing Human Locomotion," Master's Thesis, University of Minnesota, pp. 1-100, Jul. 2010.

P.-J. Cottinet, et al., "Electrostrictive Polymer Harvesting Using a Nonlinear Approach," Sensors and Actuators A, vol. 172, pp. 497-503, Oct. 1, 2011.

C. Shi, et al., "A Multiple-Input Boost Converter for Low-Power Energy Harvesting," IEEE Transactions on Circuits and Systems, vol. 58, No. 12, pp. 827-831, Dec. 2011.

D. Guyomar, et al., "Energy Harvesting in Electroactive Materials: A Comparison Between Ferroelectrics and Electrostrictive Polymers," Proceedings of SPIE, vol. 7984, pp. 7984-1L-1-6, Mar. 31, 2011.

* cited by examiner

EFFICIENT POWER CONVERSION APPARATUSES, METHODS AND SYSTEMS

PRIORITY CLAIM

This application is a Non-Provisional of, and claims priority under 35 U.S.C. §119(e) to, prior U.S. Provisional Patent Application Ser. No. 61/583,488, filed Jan. 5, 2012, entitled, "EFFICIENT POWER CONVERSION APPARATUSES, METHODS AND SYSTEMS". The entire contents of the aforementioned application are expressly incorporated herein by reference.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

Embodiments of the present innovations pertain to circuits for efficiently converting electrical energy to mechanical energy and vice-versa, such as within a multitude of Electro-Active Polymer (EAP) transducers, or paired EAP transducers, and more particularly include EFFICIENT POWER CONVERSION APPARATUSES, METHODS AND SYSTEMS ("EPC").

BACKGROUND

Devices that transfer electrical and/or mechanical energy to perform work or to harness energy have been developed. Transducers are commonly used to convert electrical energy into mechanical energy for actuator devices and to convert mechanical energy into electrical energy for generator devices.

SUMMARY

In one aspect, the present invention comprises electronic topologies for energy conversion between an electrical energy within a storage device such as a battery or a capacitor and electromechanical energy within a multitude of electroactive polymer transducers. The transducers may store electrical energy, such as in a capacitance that varies with elastic deformation, and store mechanical energy, such as in elastic deformations that alter electrical capacitance. The transducers are, in various implementations, capable as both mechanical actuators and electrical generators.

In some embodiments, the electronic topologies may be configured with an electronic inductive element to accommodate efficient energy conversion. The topologies may further be configured to transfer energy efficiently in either direction between transducer and storage device.

In some embodiments, the topologies may further be configured to employ only one inductive element in servicing energy transfer between the storage device and a multitude of transducers. The topologies may further be configured to allow controlled energy transfer timing, for example such that actuation and/or generation waveforms may be created.

In another aspect, the EPC may be configured for efficient transferring of mechanical energy via one or more strained and paired elastic transducers coupled to a potential energy reservoir. The system may be configured so that increased strain in one transducer of the pair will be proportional or near proportional to decreased strain in the other transducer of the pair.

In actuation mode, the paired transducers may convert electrical energy into mechanical energy. In generator mode, the paired transducers may convert mechanical energy into electrical energy. In one implementation, the potential energy reservoir comprises an elastically deformed member which imparts some of its potential energy onto the paired transducers during assembly, such as may cause them to become of unequal length. In generator mode, changes to the configuration of the deformed member, or potential energy reservoir, may translate into changes (e.g., of the length) of the paired transducers, strain increasing in one as it decreases in the other. In actuation mode, the timed application of electrical energy may cause a first transducer of the pair to lengthen, decreasing its "pulling power" and so giving a "pulling advantage" to the second, uncharged transducer of the pair.

BRIEF DESCRIPTION OF THE DRAWINGS

The accompanying appendices and/or drawings illustrate various non-limiting, example, innovative aspects in accordance with the present descriptions.

Figure 1A:
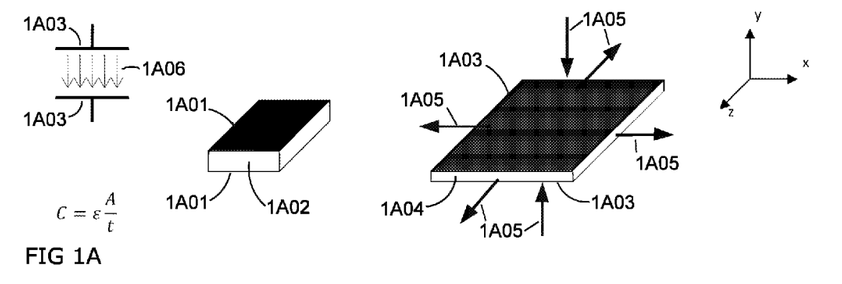
FIG. 1A shows a schematic example of an EAP transducer in one embodiment.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

ElectroActive Polymer (EAP) transducers convert between electrical energy and mechanical work by taking advantage of Coulomb (electrostatic) forces. They are relatively new devices compared to induction-based and piezoelectric transducers and have potential advantages where small size, light weight and low natural frequency are closely aligned in generator or actuator applications. Shown schematically in FIG. 1A, the EAP transducer has electronic characteristics of a capacitor and mechanical characteristics of an elastomer. Coulomb and/or externally applied mechanical forces combine in the elastomer to alter dielectric thickness and area of the capacitor. The electrical capacitance should be seen as a function of mechanical deformation. Energy within EAP transducers takes a mechanical form as elastic compression or stretch and it takes an electrical form as charge stored within the capacitor, $$W = \frac{1}{2}Cv^2.$$

The EAP transducer is capable of efficient energy conversion in either direction; i.e. as an actuator or as a generator. Applied electrical energy can produce mechanical work and applied mechanical energy can be converted to an electrical form.

Figure 1B:
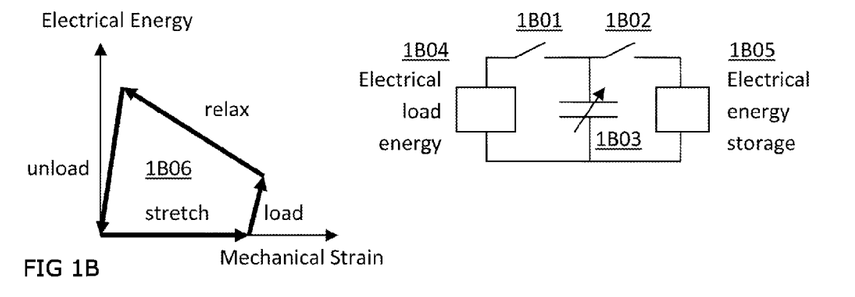
FIG. 1B shows the four steps to an EAP generation cycle in one embodiment.
Figure 1C:
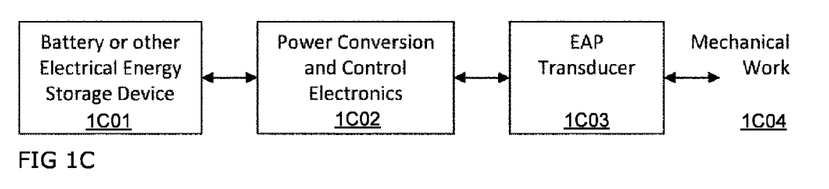
FIG. 1C shows a generalized block diagram of an electrical-mechanical energy conversion system in one embodiment.

FIG. 1C shows aspects of an electrical-mechanical energy conversion system. EAP transducers 103 are operated at very high voltages (for example, greater than 1000V) in order to maximize the electrode forces and mechanical strain. The capacitance increases with strain due to the electrodes moving closer to one another and increasing in surface area. The energy stored in the capacitor is proportional to the capacitance times the voltage squared. The mechanical strain can produce work 1C04 (force times distance) which reduces the strain within the transducer. Returning the EAP transducer to its original unstrained state requires the removal of this electrical energy and any mechanical forces. Removed electrical energy may be processed by power conversion and control electronics 1C02 and/or stored in a battery, capacitor, or other electrical energy storage device 1C01. Removed mechanical energy can be converted to electrical energy.

A schematic view of the EAP generation cycle is shown, in one embodiment, in FIG. 1B. The first step is to apply mechanical energy by stretching an uncharged EAP transducer represented as a variable capacitor 1B03. This is shown as the stretch portion of the generation cycle 1B06. Stretching results in a substantial increase of transducer capacitance because the dielectric thickness is near minimum and the electrode area is near maximum. An electrical charge is then moved from an energy source 1B04 onto the strained transducer 1B03 via switch 1B01 resulting in slightly greater strain. This is the load portion of the generation cycle 1B06. Switch 1B01 is then opened to trap loaded charge onto the EAP transducer, 1B03. As the EAP transducer 1B03 is relaxed, its capacitance decreases and, as charge is equal to voltage times capacitance, the voltage increases. Electrical energy is equal to one half times the capacitance times voltage squared. Therefore the electrical energy within the EAP transducer 1B03 increases as it is relaxed. This is the relax portion of the generation cycle 1B06. Some strain, due to electrical energy, remains within the transducer when all mechanical energy is released. The final step in the generation cycle is to move energy from the EAP transducer, 1B03, to the energy storage device, 1B05. This is accomplished by closing switch 1B02, and if circuitry is capable of removing all of the EAP transducer energy, will result in a fully relaxed the transducer. This is the unload portion of the generation cycle 1B06.

It can be noted, therefore, that the Power Conversion and Control Electronics 1C02, serve a complex set of purposes in moving energy from an electrical storage device to the transducer and back. Electrical energy may be applied to the transducer, for example, for actuation and also to support the loading portion of a generation cycle. Energy may be removed from the transducer, for example, for de-actuation and also to support the unloading portion of a generation cycle.

In some primary research and early application demonstrations that contributed to the development of the transducer, the electronics can be unidirectional. The charge pump topology FIG. 2 uses semiconductor diode switching 203, 204 switching to transfer charge from a source of generator load energy 201, to the EAP transducer 205 and from the EAP transducer 205 to the output energy storage device 202. This circuit does not require external controls but has some inefficiencies in energy transfer and requires two energy storage devices and can only function as a generator.

Figure 3:
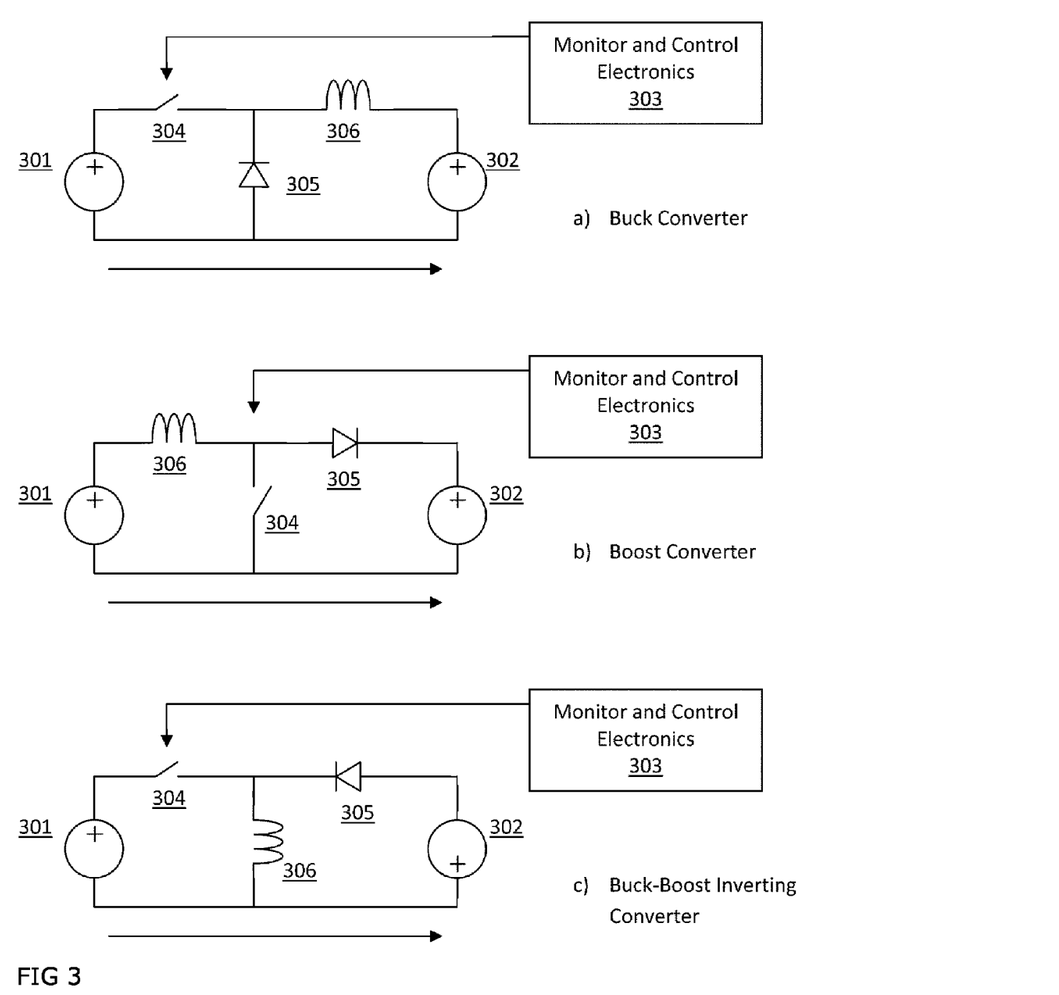
FIG. 3 shows three forms of inductor-based energy conversion topology in various implementations.

Inductor-based electrical energy conversion topologies FIG. 3 may use switching 304, inductor components 305, diode components 306, and/or the like to control power transfer from one energy storage device 301 to another 302. These may, in some implementations, be referred to as Buck, Boost and Buck-Boost converters with the difference between each being the voltage levels at each storage device. The Buck converter reduces voltage from input 301 to output 302. The Boost converter increases voltage and the Buck-Boost can increase or decrease voltage magnitude with a sign inversion. The control of voltage level at the output may be determined by switch 304 timing in addition to topology selection.

In some implementations, switches may be Insulated-Gate Bipolar Transistor ("IGBT"), Metal-Oxide-Semiconductor Field-Effect Transistor ("MOSFET"), and/or the like transistors, which are three-terminal devices where the conduction channel between two of the terminals may be controlled by voltage levels at the third terminal. Transistor switches may use complex interface circuitry and timing control electronics 303. One advantage of the inductor circuit with semiconductor switches is higher energy conversion efficiency to offset the additional cost and complexity of design.

Other variations may be employed, such as the use of transistor switches in place of the diode switches 306 for additional efficiency improvements and other capabilities, including, for example, the ability to move energy in either direction between energy storage devices, 301, 302.

The capacitive nature of the EAP transducer allows it to be used as an electrical energy storage device in either 301 or 302 location in inductor-base conversion architectures.

Figure 2:
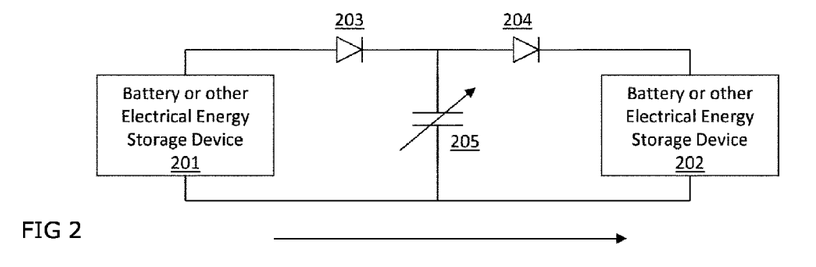
FIG. 2 shows an example of charge-pump topology in one embodiment.

In one implementation, transistor switches may replace diodes 203, 204 in the charge pump topology of FIG. 2 to accommodate energy transfer in either direction.

Many applications, such as, for example, a toy moving robot, may employ a large number of transducers and require highly efficient power conversion to support long battery life and may be sensitive to size and weight. Generator applications, such as, for example, harvesting energy from a slow-moving river, may also benefit from a large number of transducers. For a given application, a system in which electrical power is distributed to/from multiple small transducers may operate more efficiently than an alternative in which mechanical forces are distributed between a single large electromechanical transducer and multiple points.

Both the charge pump and the inductor-based topologies may, in various implementations, allow actuation (movement) and generation (recovery of energy when the transducer is returned to its original state). The charge pump topology may have a low complexity that may reduce the parts count within an application but its efficiency is not optimal for battery powered devices. The inductor-based topologies may have the greater efficiency but may become complex—especially in high voltage implementations of the EAP transducer which is discussed next.

The voltage-current relationship of an inductor, ignoring winding resistance, can be described by the formula:

$$V_L = L \frac{dI}{dt}$$

meaning that the current increases linearly in time in proportion to the applied voltage and inversely proportional to the inductance. In energy conversion applications, inductance and applied voltage may be directly proportional. As the EAP transducer achieves mechanical efficiency with higher voltages, the energy conversion inductor can become physically large in order to maintain a reasonable rate of current during switching cycles. While the inductor-based topology may have sufficient efficiency to support a toy robotic application for example, it may employ a multitude of expensive and massive inductors to support the multitude of EAP transducers.

Embodiments discussed herein present efficient conversion apparatuses, methods and systems and an embodied example of an electromechanical system utilizing paired transducers which are mechanically coupled to each other, such as described in some embodiments in co-pending U.S. non-provisional patent application Ser. No. 12/347,601 filed Jan. 10, 2012, entitled, "Mechanisms for creating undulating motion, such as for propulsion, and for harnessing the energy of moving fluid," co-pending U.S. non-provisional patent application Ser. No. 12/617,618 filed Nov. 12, 2009, entitled, "Pliant or Compliant Elements for Harnessing the Forces of Moving Fluid to Transport Fluid or Generate Electricity," and U.S. Pat. No. 7,696,634, issued Apr. 13, 2010, entitled, "Pliant Mechanisms for Extracting Power From Moving Fluid," the entire contents of all of which are hereby incorporated by reference.

Embodiments of the Efficient Power Converter (EPC) may support a multitude of EAP transducers while also being configurable to direct the movement of energy between electrical and mechanical forms in either direction and with high efficiency.

Figure 4:
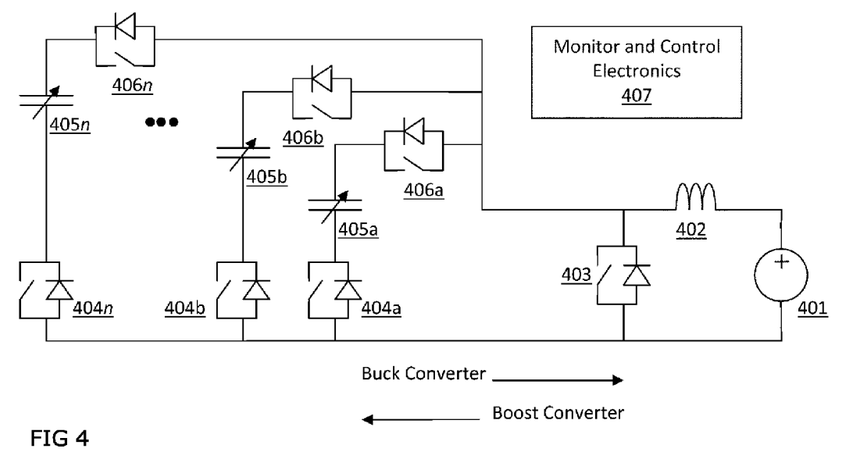
FIG. 4 shows an example embodiment of actuate-generate topology of the invention.

A different topology, in one embodiment, that simultaneously allows moving energy in both directions; between an energy source and a multitude of transducers; with high efficiency and only one inductor, is provided in FIG. 4. Embodiments may include one or more sets of EAP switches 404, 406 (404a and 406a service EAP 405a, while 404b and 406b service EAP 405b, and so on through 404n and 406n servicing EAP 405n in FIG. 4); one or more EAP, transducers, variable capacitors, and/or the like (similarly identified as 405a, 405b, through 405n); an inductor 402; an electrical energy storage device, 401; and an energy load switch 403, and/or the like. In some implementations, excitation signals may be selectively and/or sequentially applied to the conversion switch 403 and to one or more transducer switches 404, 406 to effectuate an actuation mode and/or a generation mode of operation, as described below.

Figure 5:
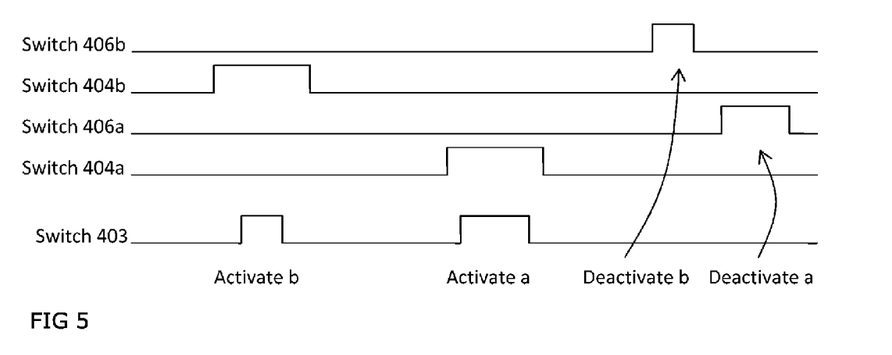
FIG. 5 shows switch timing relationships for actuation and generation capabilities of the new topology in one embodiment.

FIG. 5 shows switch timing relationships in an example actuation and de-actuation of two of the EAP transducers in one embodiment. As actuation is moving energy from the storage device, 401, to the selected transducer, the actuation process can be understood as functionally equivalent, or substantially similar, to the loading portion of a generation cycle for the selected transducer. Similarly, as de-actuation is moving energy from the selected transducer to the storage device, the de-actuation process can be understood as functionally equivalent, or substantially similar, to the unloading portion of the generation cycle for the selected transducer. In other words, the timing relationships of FIG. 5 may be used for actuator applications and generator applications. Applications that efficiently alternate between actuation and generation, such as riding a scooter over hilly terrain, are contemplated and described herein.

The control signals for switches 403, 404a, 406a, 404b and 406b are indicated in this example. A high-level signal indicates the time during which the switch is closed or otherwise providing a low-resistance connection between switch terminals. A low-level signal indicates the time during which the switch is open or otherwise providing a high-resistance or isolation between switch terminals.

As discussed previously, timing at the high-voltages employed by EAP transducers is useful for controlling inductor current and thereby energy transfer. In particular, it is the duration of the switch closure and not the precise time that the switch closes that is useful. This is noted in the pulse-width of the switch high time, in the timing diagram. The switch is open when the timing signal is low. There are two switches in series with each EAP transducer. The 404 switch (404a, 404b and 404n) is an EAP selector switch, which selects which transducer will be the recipient of energy from the inductor during actuation. Therefore, the first actuation in the timing diagram is the actuation of EAP transducer 405b which is accomplished by selecting the transducer with switch 404b and precisely controlling the pulse-width of switch 403 to move the desired quantity of energy from the electrical energy storage device, 401, to the inductor 402. Upon opening of switch 403, the energy stored in the inductor 402 will flow to the selected EAP transducer, 405b, in this case. In a similar process, a second EAP transducer is actuated in this timing example. EAP 405a is selected next by the closing of switch 404a in the timing diagram with subsequent energy transfer (actuation) controlled again by the pulse-width of switch 403.

The 406 switch (406a, 406b and 406n) is used to move energy from the EAP transducer (405a, 405b and 405n, respectively) to the energy storage device, 401. EAP transducers store charge and therefore remain actuated until de-actuated. The timing diagram of FIG. 5 first shows the de-actuation of EAP transducer 405b by controlled pulse-width of switch 406b closure which energizes the inductor 402 to a desired level. Upon opening of 406b, the energy flows from inductor 402 to the energy storage device 401. The timing diagram then shows the de-actuation of a second EAP transducer, 405a by controlled pulse-width of switch 406a which energizes the inductor 402 to a desired level. As described in the de-actuation of EAP transducer 405b, the opening of switch 406a results in the transfer of energy from the inductor 402 to the energy storage device 401.

The pulse-width timing of the 403 and 406 switches determines the quantity of energy that is moved. A precise control of transducer actuation, i.e. the speed and wave-shape of mechanical movement, is employed by the EPC. Control methods, protocols, algorithms, and/or the like within a system of transducers may modulate the energy transfer versus time for such actuation.

Figure 6:
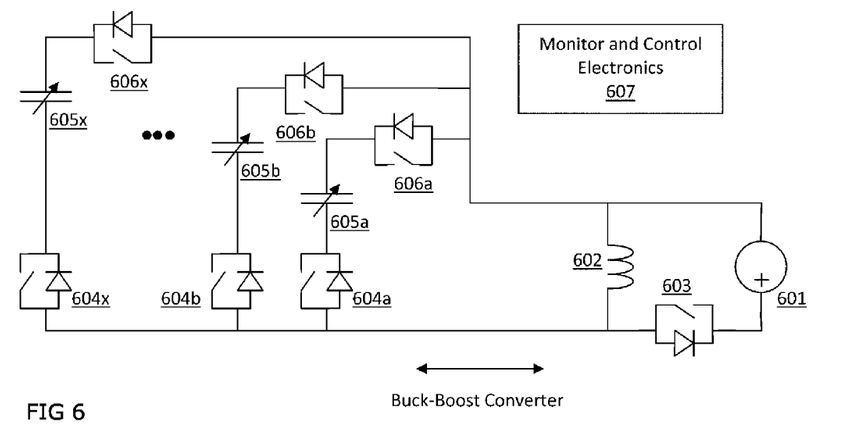
FIG. 6 shows an alternative example embodiment of actuation-generate topology of the invention.

An alternative topology that also simultaneously allows for moving energy in both directions; between an energy source and a multitude of transducers; with high efficiency and only one inductor, is provided in one embodiment in FIG. 6. Embodiments may include one or more sets of EAP switches 604, 606 (604a and 606a service EAP 605a, while 604b and 606b service EAP 605b, and so on through 604n and 606n service EAP 605n); one or more EAP, transducers, variable capacitors, and/or the like (similarly identified as 605a, 605b, through 605n); an inductor 602; an electrical energy storage device, 601; and an energy load switch 603, and/or the like. The purpose and operational description of each of the components in FIG. 6 is the same, or substantially similar, as provided for the respective component (component 603 is same as component 403, component 604a is same as component 404a, and so on for all components in FIG. 6) in the description of FIG. 4. The pulse-width details for energy transfer are not the same in FIG. 6 when compared to FIG. 4 due to differences in the voltage imposed on the inductor.

The switch timing relationships shown in FIG. 5 and described for the topology of FIG. 4 are also applicable to the alternative embodiment of FIG. 6 given the respective component numbering (component 603 is same as component 403, component 604a is same as component 404a, and so on for all components in FIG. 6).

Figure 7:
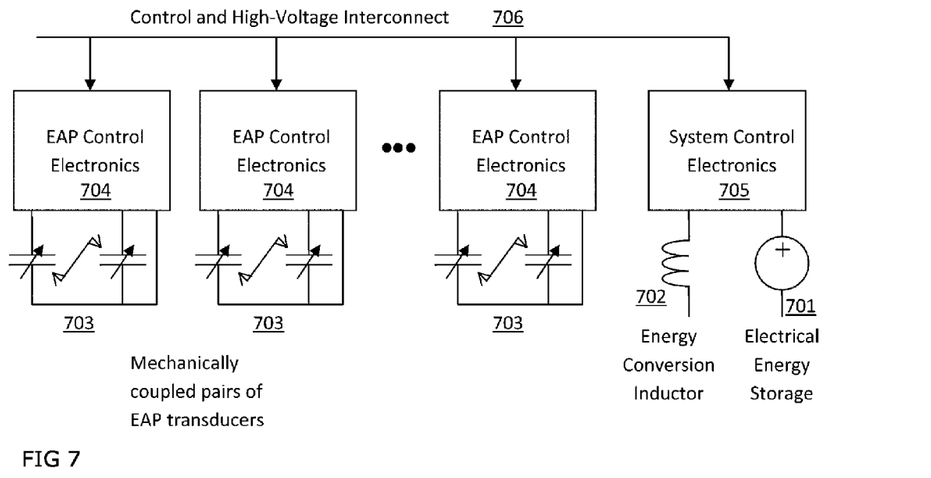
FIG. 7 shows an example system embodiment of actuate-generate topology with mechanically coupled EAP transducers.

FIG. 7 shows a system of EAP transducers with waveform control architecture, in one embodiment. In this system, controllers near the transducers, 704, provide the deactuation (or unloading) timing while a system control electronics, 705, provide activation and coordination of waveform activity. The multitude of control utilizes a communications interconnect (706). The energy conversion inductor (702) and electrical energy storage (701) are the same, or substantially similar, as those discussed previously.

Efficient energy conversion between electrical and mechanical forms in either direction is made possible by the EPC. Returning to the toy moving robot application described previously, the cycle of actuation and deactuation of subsequent legs of the robot may include the movement of energy from the energy storage device to a transducer and back to the energy storage device many times over. The EPC may further allow for the overall system efficiency to be further enhanced by coupling transducers such that the energy released from the relaxation of EAP in one transducer is captured in the straining of the next. This aspect is discussed in detail elsewhere. The electrical architecture disclosed takes advantage of coupling by sharing the control electronics among pairs because critical timing is not needed at both simultaneously.

Figure 8:
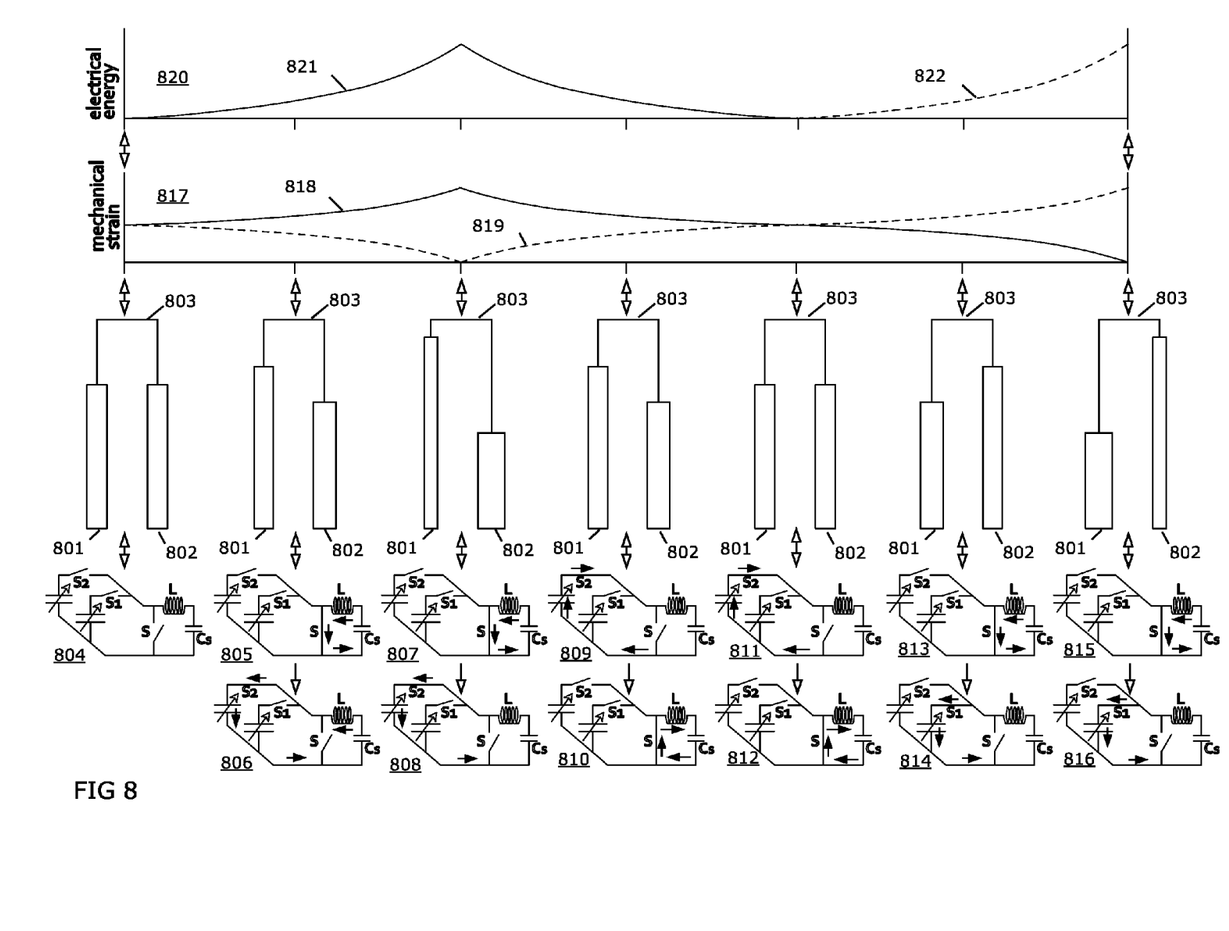
FIG. 8 shows a system diagram, in one embodiment, for three quarters of an actuation cycle showing the relationships between electrical energy, mechanical strain of transducers and corresponding circuit switching and current flows.

FIG. 8 is an example of a system diagram for three quarters of an actuation cycle showing the relationships between electrical energy, mechanical strain of paired and mechanically coupled transducers 801 and 802, and corresponding circuit switching and energy flows. A first transducer 801 and second transducer 802 are paired via a mechanical coupling 803 such that they swap elastic energy between each other. Circuitry states 804-816 show the functional switching of energy conversion electronics based on one embodiment of the invention. Circuitry state 804 shows all switches are open at the mechanical equilibrium of the first transducer 801 and second transducer 802. In this state, the electrical energy in transducer 801 is equal to the electrical energy in transducer 802 and shown at an arbitrary baseline in 819. In circuit state 805, the inductor circuit is closed and electrical energy is transferred from the storage capacitor or external power supply to the inductor. In circuit state 806 the switch to the inductor opens and the switch to the first transducer 801 closed, allowing energy to transfer from the inductor to charge and actuate the first transducer 801. Correspondingly, the first transducer 801 elongates and the second transducer 802 shortens. The process of transferring energy to the inductor and then to the first transducer 801 is repeated in circuit states 807 and 808. In practice, this process may be repeated many times with energy levels and state transition timing and transducer selection designed to create a desired actuation waveform.

Ignoring small leakage currents as may be associated with specific switching technology and other imperfections, mechanically coupled transducers 801 and 802 store (i.e. hold) charge and need to be de-actuated in a process that removes energy from the transducer and returns it, in as much as possible, to the energy storage capacitor or external power supply. This process is shown in circuit states 809 and 810. In circuitry state 809 the switch to the first transducer 801 is closed which transfers energy from transducer 801 to the inductor. In circuit state 810 the switch between the transducer and the inductor opens and the switch of the inductor circuit immediately closes, allowing energy to transfer from the inductor to storage capacitor or external power supply. Correspondingly the second transducer 802 elongates and the first transducer 801 shortens. The process of transferring energy from the first transducer 801 to the inductor and then to the storage locations is repeated in circuit states 811 and 812. In practice, this process may be repeated many times with energy levels and state transition timing and transducer selection such as required to create a desired de-actuation waveform.

Circuit states 813-816 show an embodiment of two cycles of energy transfer from the storage capacitor to the second transducer 802. The process is functionally similar to the previously discussed cycles and is not repeated here. States 813-816 indicate that the baseline energy in 819 can be arbitrarily set at a non-zero level. With, for example, an equivalent partial energy in both the first transducer 801 and the second transducer 802, and all switches open as in circuit state 804, the system can rest at mechanical equilibrium. Actuation to lengthen the second transducer 802 can be accomplished by either transferring energy to the second transducer 802 as was shown in circuit states 813 and 814 or by removing energy from the first transducer 801 as was shown in states 805 and 806, and/or by a combination of both energy transfers.

Plots of mechanical strain 817 are shown for the first transducer 818 and second transducer 819 during the circuit sequences described above. Plots of the electrical energy 820 are shown of the first transducer 821 and second transducer 822 during the circuit sequences described above.

Figure 9:
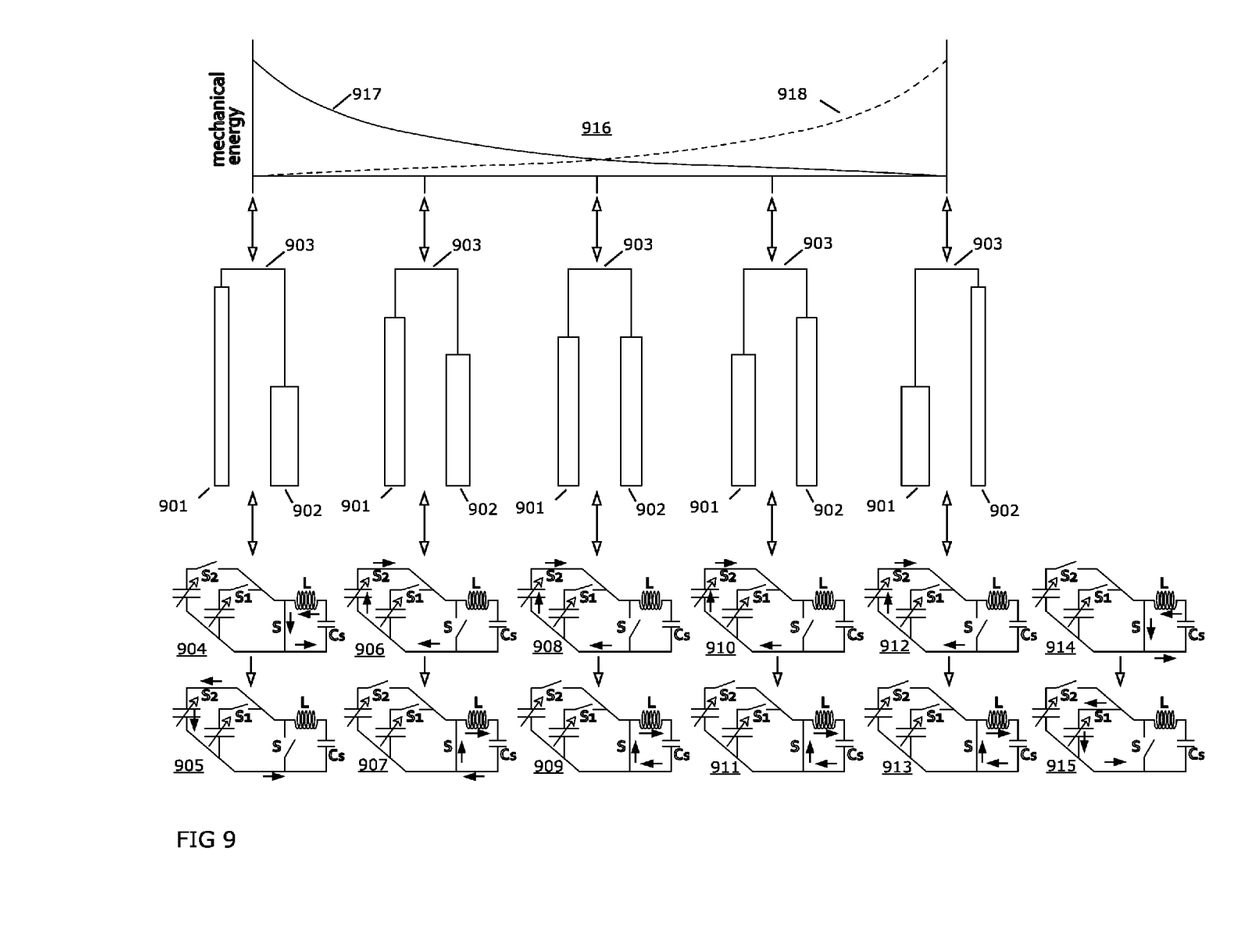
FIG. 9 shows a system diagram, in one embodiment, for half of a generation cycle showing the relationships between electrical energy, mechanical strain of transducers and corresponding circuit switching and current flows.

FIG. 9 is an example of a system diagram for one half of a generation cycle showing the relationships between the mechanical energy of transducers and corresponding circuit switching and energy flows. Initially all the switches are open and the transducers are uncharged. Following the four steps of the EAP generator cycle, such as in FIG. 1B, after the first transducer 901 has been mechanically stretched via the mechanical coupling 903 to its maximum, the inductor switch of circuit state 904 is closed for a specific duration to transfer energy from the storage capacitor to the inductor. In circuit state 905 the inductor switch is opened and the switch to the first transducer 901 is immediately or quickly closed, which allows charge to move from the inductor to the first transducer 901. Circuit states 904 and 905 may be repeated as many times as necessary to load the desired level of charge onto the first transducer 901. At circuit states 906-913, the first transducer 901 is relaxing and shortening and thickening which decreases capacitance, increases voltage and converts mechanical energy to electrical energy. For the purposes of this description, the first transducer's 901 energy is moved to the storage capacitor in 4 cycles. In practice, many more cycles may be utilized in order to manage inductor currents to a reasonable or desired level. At circuit state 906 the switch to the first transducer 901 is closed to move energy from the transducer to the inductor. At circuit state 907 the transducer switch is opened and the inductor circuitry switch immediately closes to transfer the electrical energy from the inductor to the capacitor or external power source. This process is repeated three more times in circuit states 908-913 as the first transducer continues to relax. The second transducer 902 is mechanically stretched via the mechanical coupling 903 to its maximum as the first transducer 901 is relaxed to its minimum during circuit states 906-913. The inductor switch is closed for a specific transfer of energy, first to the inductor in circuit state 914 and then to the second transducer 902 in circuit state 915 in order to load energy into the strained second transducer 902 for the second half of the generation cycle.

Plots of mechanical energy 916 are shown for the first transducer 917 and second transducer 918 during the circuit sequences described above.

The pairing of elastic transducers in the system is another aspect of the invention which increases efficiency. Examples of systems utilizing this increased efficiency are described in U.S. non-provisional patent application Ser. No. 12/347,601 filed Jan. 10, 2012, entitled, "Mechanisms for creating undulating motion, such as for propulsion, and for harnessing the energy of moving fluid," U.S. non-provisional patent application Ser. No. 12/617,618 filed Nov. 12, 2009, entitled, "Pliant or Compliant Elements for Harnessing the Forces of Moving Fluid to Transport Fluid or Generate Electricity," and U.S. Pat. No. 7,696,634, issued Apr. 13, 2010, entitled, "Pliant Mechanisms for Extracting Power From Moving Fluid," the entire contents of all of which are hereby incorporated by reference. One example from the above is described here in FIGS. 10-11 and the efficiency characteristics are described.

Figure 10:
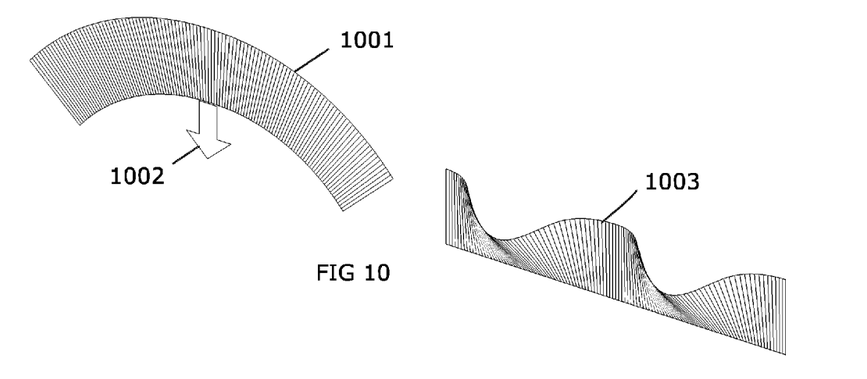
FIG. 10 illustrates one implementation of a method for creating a potential energy reservoir by deforming a flexible sheet.

A member made of a flexible material 1001 has a force or forces applied 1002 to deform the member 1003, FIG. 10. The deformed member 1003 may be coupled to paired transducers 1104 in a manner such that some but not all of the potential energy from the deformation process of FIG. 10 is imparted onto paired transducers 1104, FIG. 11. The paired transducers 1104 are strained and then coupled to a common anchoring point 1105. The transfer of elastic potential energy from the deformed member 1003 into the paired transducers 1104 causes some of the transducers 1104 to lengthen and strain more than others. A longitudinal sequence of paired transducers 1104 will have a strain pattern that corresponds to the deformation shape of the deformed member 1003. Most of the potential energy of the deformed member 1003 remains in the deformed member 1003 since the deformed member 1003 cannot fully relax to it pre-deformed, zero energy state. The deformed member 1003 becomes a potential energy reservoir ("PER") 1107 which can swap potential energy between the paired transducers 1104. In generator mode, forces 1106, such as from fluid flow, interacting with the deformed member 1003, or PER 1107, may cause the configuration of the deformations in the PER 1107 to shift. This configuration change of the PER 1107 translates into configuration changes of the paired transducers 1104, causing them to either lengthen or shorten. The mechanical energy released during relaxation of one in the pair of transducers 1104 is transferred via the PER 1107 to the other in the pair of transducers 1104.

Figure 11:
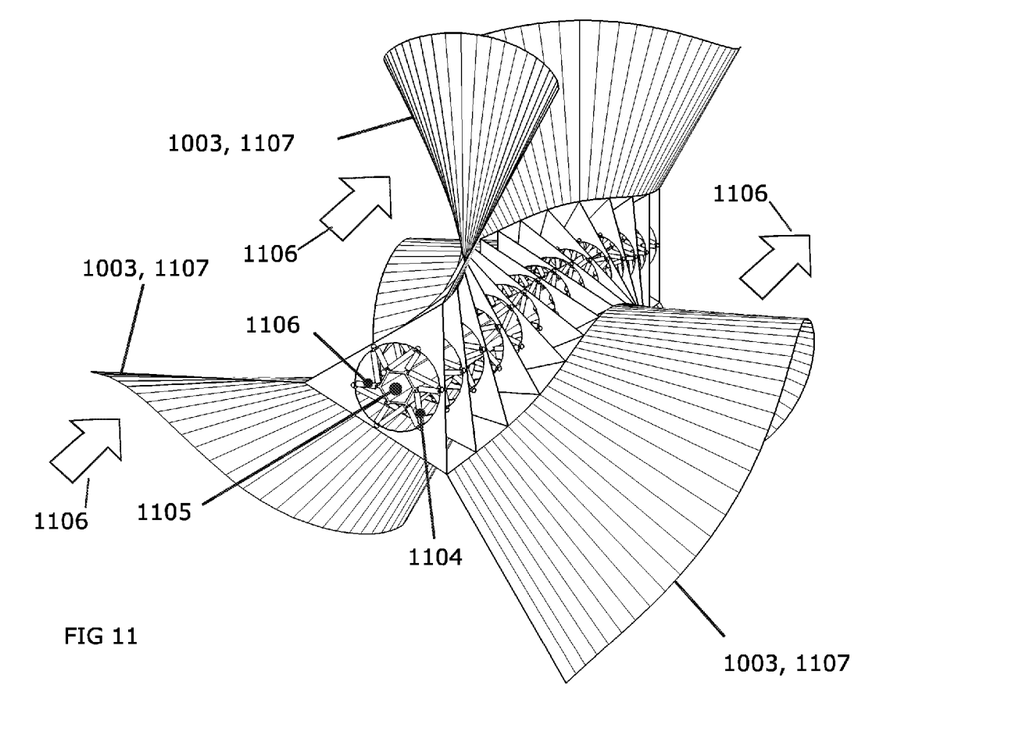
FIG. 11 illustrates actuation/generation in one embodiment.

The stretch-relax cycles of transducers required to extract electrical energy from the system therefore do not discard mechanical energy during relaxation cycles but instead pass their mechanical energy via the PER 1107 to transducers undergoing the strain cycle.

The deformed member 1003, 1107 tries to relax to its pre-deformed state, and by coupling to the paired transducers 1104, the deformed member 1003, 1107, imparts some of its potential energy to the paired transducers 1104, causing one in the pair to lengthen as the other in the pair shortens. Changes to the configuration of the PER 1107 energy state translate into changes to the configuration of the paired transducers 1104. The PER 1107 serves both to create unequal lengths and energy states of the two transducers in the pair and to transfer potential energy between the two transducers in the pair.

The system diagram of FIG. 9 shows how strain and mechanical energy 916 are transferred between a pair of mechanically coupled 903, first transducer 901 and second transducer 902 during half a generation cycle, in a sequence corresponding to circuitry states 904-915. In one implementation, the mechanical energy curve 917 of the first transducer 901 is the inverse of the mechanical curve 918 of the second transducer 902.

In actuation mode, electrical energy applied to the first transducer 901 of the paired transducers 1104 causes its mechanical energy to increase. However, the electrical energy also causes it to lengthen so that its pulling strength is reduced. This causes the balance of power to shift and may allow the second transducer 902 to contract. In contracting, the non-actuated member imparts force onto the PER 1107 (1003), causing its energy state and physical configuration to change. Coordinated sequential actuation of transducers therefore may allow the deformed member 1003 to do mechanical work, such as impart forces onto a fluid medium (e.g., for pumping and/or propulsion embodiments).

Therefore, in actuation mode, mechanical action arises from the relaxation-pull of a first transducer of the paired transducers 1104 by applying charge to a second transducer of the paired transducers 1104 which causes it to lengthen. The mechanical action may be transferred to the deformed member 1003 to which the paired transducer 1104 is coupled.

To clarify the characterization of the deformed member 1003 as a PER 1107, it can be noted that removal of the PER 1107 would cause all of the paired transducers 1104 to become of equal length to assume their zero energy state. Actuation of one transducer of the paired transducers 1104 would cause it to lengthen but since the transducers are elastic and elongate, they would be unable to perform significant mechanical work without buckling.

This configuration of paired, strained elastic transducers overcomes a known limitation of EAPs as "push" and "pull" actuators. Most applications of EAP actuators are for the creation of planar deformations. Stacked EAP actuators exist but are capable of only limited axial length change compared with the large axial length changes of the strained, paired transducer 1104 of the system described here.

The actuation system diagram FIG. 8 shows the mechanical strain curves 817 of a first transducer 801 and second transducer 802 of a paired transducer. In one implementation, the mechanical strain curve 818 of the first transducer 801 is the inverse of the mechanical strain curve 819 of the second transducer 802. At the start of the strain curves 817, both transducers are strained but in equilibrium. As the first transducer 801 is actuated in circuitry states 805-806, the first transducer 801 lengthens. This gives the first transducer less pulling power and mechanical energy is transferred via the PER 1107 to the second transducer 802 which may contract.

Figure 12:
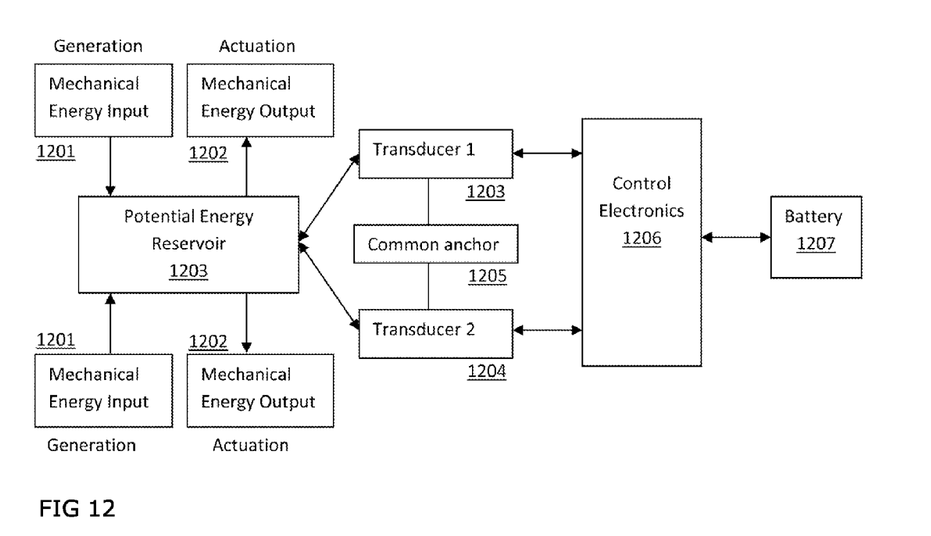
FIG. 12 shows the diagram of an efficient electrical-mechanical energy conversion system with potential energy reservoir in one embodiment.

FIG. 12 shows a block diagram, in one embodiment, of an efficient electrical-mechanical energy conversion system with PER 1203. The bi-directional energy conversion system can work in either generation or actuation mode. In the generation mode, Mechanical energy input 1201 may increase the energy state in the potential energy reservoir 1203. The increased potential energy will drive a pair of transducers 1203 and 1204 that are coupled by a common anchor 1205 into new mechanical equilibrium states. Electromechanical transducers, such as EAPs, may convert the mechanical energy to electrical energy which can be harvested by control electronics 1206 and further stored in a battery 1207 or other direct application. In actuation mode, a battery 1207 or other external sources supplies electrical power to the control electronics 1206, which distribute electrical power to electromechanical transducers 1203 and 1204. Actuation of transducers transfers mechanical energy from the PER 1203 such that the system may produce a large actuation force or displacement or both as mechanical energy output 1202.

Figure 13A:
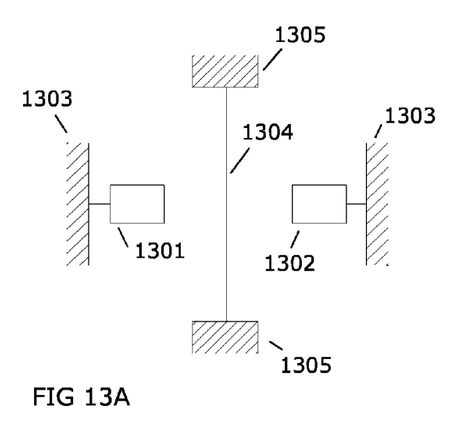
FIGS. 13A-D shows selective actuation of paired transducers causing a flexible member to switch from one bi-stable state to another in one implementation.
Figure 13B:
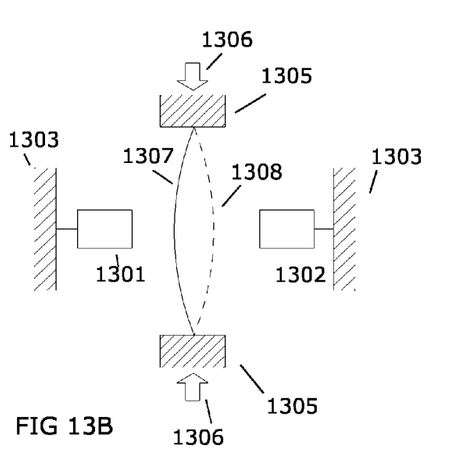
Figure 13C:
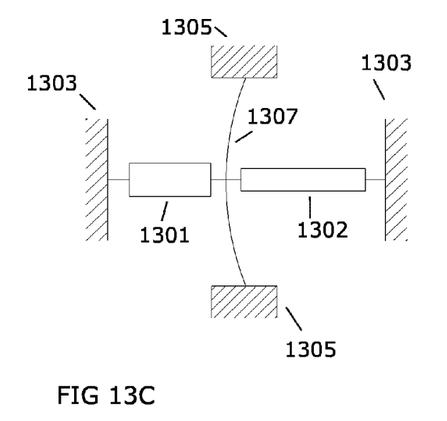

FIGS. 13A-C illustrate, in one embodiment, the role of the PER 1203 and how actuation of a first transducer 1301 creates passive pull from the second transducer 1302 of the transducer pair (801-802, 1106, 1203-1204 of FIGS. 8, 11, 12).

Figure 13D:
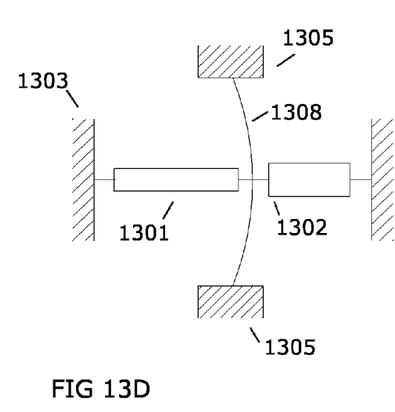

In FIG. 13A a first 1301 and second 1302 elastic transducer are fixed 1303. A flexible member 1304 is secured at both ends 1305. Force or forces 1306 deform the flexible member 1304 so that it buckles and energy from the deformation force 1306 is maintained through coupling restraints 1305, FIG. 13B. The flexible member 1304 is now high in potential energy and has two stable states, 1307 and 1308 and it now serves as the PER, 1107, 1203 (FIGS. 11, 12). In FIG. 13C the paired transducers 1301, 1302, are strained from their relaxed state so as to fix them to the flexible member 1304 which is in its strained state 1307, but the flexible member 1307 cannot straighten out due to coupling restraints 1305. The second transducer 1302 is strained more than the first transducer 1301 due to the geometric asymmetry of the flexible member in its strained state 1307. In FIG. 13D, actuation of the first transducer 1301 causes it to lengthen so that the strain in the second transducer 1302 may "gain the upper hand" and pull the flexible member 1304 (1107, 1203) into its second state, 1308. De-actuating the first transducer 1301 and actuating the second transducer 1302 may cause the flexible member 1304 to switch back to its first state 1307. In this manner the flexible member 1304 can perform mechanical work. If external forces act upon the flexible member 1304 (1107, 1203) causing it to switch between states 1307 and 1308, the resulting stretching and relaxing of the first and second transducers 1301, 3102 may allow them to operate in generator mode as detailed above.

In order to address various issues and advance the art, the entirety of this application for EFFICIENT POWER CONVERSION APPARATUSES, METHODS AND SYSTEMS (including the Cover Page, Title, Headings, Field, Background, Summary, Brief Description of the Drawings, Detailed Description, Claims, Abstract, Figures, Appendices and/or otherwise) shows by way of illustration various embodiments in which the claimed inventions may be practiced. The advantages and features of the application are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further un-described alternate embodiments may be available for a portion is not to be considered a disclaimer of those alternate embodiments. It will be appreciated that many of those un-described embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

The invention claimed is:

1. A power conversion system, comprising:
   a series circuit including a storage capacitor, an inductor, and a conversion switch; and
   a plurality of transducers and transducer switches, where each transducer is conductively coupled in series with at least one transducer switch, in parallel with others of the plurality of transducers and transducer switches, and in parallel with the conversion switch.

2. The power conversion system of claim 1, wherein each of the plurality of transducers comprises an electroactive polymer.

3. The power conversion system of claim 1, wherein each of the plurality of transducers comprises a variable capacitor.

4. The power conversion system of claim 1, further comprising:
   at least one diode conductively coupled in parallel with the conversion switch.

5. The power conversion system of claim 1, further comprising:
   at least one diode conductively coupled in parallel with the transducer switch.

6. The power conversion system of claim 1, wherein the conversion switch comprises a transistor switch.

7. The power conversion system of claim 1, wherein the transducer switch comprises a transistor switch.

8. The power conversions system of claim 1, wherein each transducer is conductively coupled in series with at least two transducer switches.

9. The power conversion system of claim 1, wherein at least two of the plurality of transducers are mechanically coupled.

10. The power conversion system of claim 9, wherein the at least two of the plurality of transducers are configured to swap elastic energy between each other.

11. A power conversion system, comprising:
    a series circuit including a storage capacitor, an inductor, and a conversion switch;

at least one transducer and transducer switch, conductively coupled in series with each other and in parallel with the conversion switch; and a control circuit configured to sequentially close the conversion switch and the transducer switch, wherein closing of the conversion switch followed by closing of the transducer switch corresponds to an actuation mode; and wherein closing of the transducer switch followed by closing of the conversion switch corresponds to a generation mode.

12. The power conversion system of claim 11, wherein the at least one transducer comprises at least one electroactive polymer.

13. The power conversion system of claim 11, wherein the at least one transducer comprises at least one variable capacitor.

14. The power conversion system of claim 11, further comprising:

at least one diode conductively coupled in parallel with the conversion switch.

15. The power conversion system of claim 11, further comprising:

at least one diode conductively coupled in parallel with the transducer switch.

16. The power conversion system of claim 11, wherein the conversion switch comprises a transistor switch.

17. The power conversion system of claim 11, wherein the transducer switch comprises a transistor switch.

18. The power conversion system of claim 11, wherein the at least one transducer is conductively coupled in series with at least two transducer switches.

19. The power conversion system of claim 11, wherein the at least one transducer comprises at least two transducers that are mechanically coupled.

20. The power conversion system of claim 11, wherein the control circuit further comprises:

at least one transducer control circuit;

at least one system control circuit conductively coupled to the at least one transducer control circuit by at least one communications interconnect.

* * * * *